United States Patent
Manabe et al.

(10) Patent No.: US 11,035,136 B1
(45) Date of Patent: Jun. 15, 2021

(54) SELF-PROPELLED ROBOT FOR REBAR BINDING

(71) Applicants: Ken Robotech Corp., Kagawa (JP); SUN-S CO., LTD., Hiroshima (JP)

(72) Inventors: Tatsuya Manabe, Kagawa (JP); Haruhisa Inoue, Kagawa (JP); Yoshimasa Kimura, Hiroshima (JP); Kan Nakajima, Hiroshima (JP)

(73) Assignees: Ken Robotech Corp., Kawaga (JP); SUN-S CO., LTD., Hiroshima (JP)

( * ) Notice: Subject to any disclaimer, the term of this patent is extended or adjusted under 35 U.S.C. 154(b) by 0 days.

(21) Appl. No.: 17/054,019

(22) PCT Filed: Nov. 7, 2019

(86) PCT No.: PCT/JP2019/043668
§ 371 (c)(1),
(2) Date: Nov. 9, 2020

(87) PCT Pub. No.: WO2020/095992
PCT Pub. Date: May 14, 2020

(30) Foreign Application Priority Data

Nov. 8, 2018 (JP) .............................. JP2018-210286

(51) Int. Cl.
*E04G 21/00* (2006.01)
*E04G 21/12* (2006.01)
(Continued)

(52) U.S. Cl.
CPC ............ *E04G 21/123* (2013.01); *B25J 5/007* (2013.01); *B25J 9/1664* (2013.01); *B60W 10/04* (2013.01);
(Continued)

(58) Field of Classification Search
None
See application file for complete search history.

(56) References Cited

U.S. PATENT DOCUMENTS 5,938,099 A * 8/1999 Ciccarelli ............... B21F 15/06
227/19
10,457,429 B1 * 10/2019 Guyer ..................... B21F 15/02
(Continued)

FOREIGN PATENT DOCUMENTS

JP H06218470 A 8/1994
JP H07-6294 B2 1/1995
(Continued)

OTHER PUBLICATIONS

International Search Report for corresponding International Application No. PCT/JP2019/043668, dated Dec. 10, 2019.
(Continued)

*Primary Examiner* — Jonathan M Dager
(74) *Attorney, Agent, or Firm* — Renner, Otto, Boisselle & Sklar, LLP (57) ABSTRACT

A self-propelled robot for rebar binding including wheel units that travel on intersecting rebars; frame units mounted multiply aligned on right and left of the wheel units corresponding to an array interval of the rebars on which the wheel unit travels, binder holding units positioned between a front wheel and rear wheel of the wheel unit and by which rebar binders that bind intersecting rebars are detachably mounted per each wheel unit; driving units each having a binder driving portion that drives the binder holding unit up and down; and a control unit that controls travel motion of the wheel units and binding motion of the rebar binder. The driving units each include a trigger driving pin, and the control unit having a binding control portion that causes the trigger driving pins of the driving units to simultaneously and respectively press the triggers of the rebar binders.

7 Claims, 7 Drawing Sheets

(51) Int. Cl.
- *B60W 10/04* (2006.01)
- *B60W 10/30* (2006.01)
- *B60W 60/00* (2020.01)
- *E04C 5/16* (2006.01)
- *B25J 9/16* (2006.01)
- *B25J 5/00* (2006.01)

(52) U.S. Cl.
CPC ........ *B60W 10/30* (2013.01); *B60W 60/0025* (2020.02); *E04C 5/166* (2013.01); *B60W 2300/17* (2013.01); *B60W 2554/60* (2020.02); *B60W 2710/18* (2013.01); *B60W 2710/30* (2013.01)

(56) References Cited

U.S. PATENT DOCUMENTS

| | | | | |
|---|---|---|---|---|
| 10,920,434 | B1* | 2/2021 | Pearson, Jr. | ............ E04G 21/16 |
| 2009/0283167 | A1* | 11/2009 | Nakagawa | ............ E04G 21/123 |
| | | | | 140/111 |
| 2009/0283169 | A1* | 11/2009 | Itagaki | .................. E04G 21/122 |
| | | | | 140/119 |
| 2016/0108632 | A1* | 4/2016 | Lu | ............................ B65B 13/06 |
| | | | | 100/25 |
| 2017/0335582 | A1* | 11/2017 | Machida | ............... E04G 21/123 |
| 2018/0181134 | A1* | 6/2018 | Muck | ................... G05D 1/0094 |
| 2018/0333764 | A1* | 11/2018 | Rapperstorfer | ........ B25J 9/1682 |
| 2020/0101616 | A1* | 4/2020 | Fan | ........................ G06N 20/00 |
| 2020/0140070 | A1* | 5/2020 | George | .................... B64D 1/22 |
| 2020/0147797 | A1* | 5/2020 | George | .................. B25J 11/005 |
| 2020/0240145 | A1* | 7/2020 | Martter | ..................... E04B 5/32 |

FOREIGN PATENT DOCUMENTS

| | | |
|---|---|---|
| JP | 2017080772 A | 5/2017 |
| JP | 2019-039174 A | 3/2019 |

OTHER PUBLICATIONS

Written Opinon for corresponding International Application No. PCT/JP2019/043668, dated Dec. 10, 2019.

Ito Toshiaki, et al., Development of Automatic Reinforcing Bar Binding Robot:—Design Development of Ivloving Mechanism and Binding Mechanism—, The Proceedings of JSME annual Conference on Robotics and Mechatronics (Robomec) 2017:1P2-C05, Nov. 2017, with English Abstract (cited in the specification).

Notice of Reasons for Refusal for corresponding Japanese Application No. 2018-210286, dated Apr. 24, 2019.

Decision to Grant for corresponding Japanese Application No. 2018-210286, dated Dec. 3, 2019.

* cited by examiner

SELF-PROPELLED ROBOT FOR REBAR BINDING

TECHNICAL FIELD

The present invention relates to a self-propelled robot for rebar binding that automatically travels on a plurality of rebars laid out on a work surface in a lattice shape and that is equipped with a rebar binder that mutually binds intersecting parts of the rebars.

BACKGROUND ART

In constructing a structure by reinforced concrete, rebars are arranged in lattice before pouring concrete into molding boxes.

Then, binding works of binding mutually intersecting parts of the rebars by binding wires such that the rebars arranged in lattice do not move with each other are performed.

The binding work needs to be performed per mutually intersecting part of the rebars provided at equal intervals, and the more the number of the rebars used, the more the works increase.

Still further, because the binding works are performed under a severe environment such as outdoors exposed to direct sun-light or on a non-fixed unstable rebar foothold, there is a room of improvement in terms of a work environment of workers who perform the binding works.

Then, in order to improve the work environment of the workers performing the binding works, a self-propelled robot for rebar binding capable of performing the binding works while automatically traveling on a plane of the rebars has been devised (see non-patent literature 1 for example).

This self-propelled robot for rebar binding is provided with one rebar binding mechanism configured to bind mutually intersecting parts of the rebars while being movable on the rebar plane in a front-back direction and in a lateral direction.

CITATION LIST

Non-Patent Literature

[Patent Literature 1] "Development of Self-propelled Robot for Rebar Binding Design and Development of Moving Mechanism and Binding Mechanism-" by Toshiaki Ito and three others, Outline of Lectures, Lectures of Robotics and Mechatronics, General Incorporated Association The Japan Society of Mechanical Engineers, published on Nov. 25, 2017.

SUMMARY OF INVENTION

Technical Problem

However, because only one rebar binding mechanism is incorporated in the self-propelled robot for rebar binding, the rebar binding mechanism can bind only one each rebar intersecting part in one binding work. Accordingly, the abovementioned self-propelled robot for rebar binding has a problem that it is necessary to increase a number of the rebar binding self-propelled robots to quickly perform the binding works of the whole work surface.

Then, the present disclosure aims at solving the prior art problem described above. That is, the present disclosure aims at providing a self-propelled robot for rebar binding (referred to also as a "rebar binding self-propelled robot" hereinafter) that binds a plurality of rebars laid on a work surface in a lattice shape by binding wires more efficiently and stably and achieves maintenance works such as replenishment of the binding wires that occurs in the rebar binder and replacement of worn parts.

Solution to Problem

According to an invention of claim 1, the abovementioned problem is solved by a rebar binding self-propelled robot at least comprising wheel units each having a rear wheel and a front wheel that travel on any one rebar among a plurality of rebars laid out in a lattice shape, frame units mounted multiply aligned on the right and left of the wheel units corresponding to array intervals of the rebar on which the wheel unit travel, a plurality of binder holding units positioned between the front wheel and the rear wheel of the wheel unit and by which rebar binders that bind mutually intersecting parts of the rebars by using binding wires are detachably mounted, a plurality of driving units each having a binder driving portion that drives the binder holding unit up and down, a plurality of driving units each having a binder driving portion that drives the binder holding unit up and down; and a control unit that controls travel motions of the wheel units and binding motions of the rebar binders, wherein the plurality of driving units is provided with trigger driving pins, respectively, and wherein the control unit includes a binding control portion that causes the trigger driving pins of the plurality of driving units to simultaneously press triggers of the plurality of rebar binders.

According to an invention of claim 2, the abovementioned problem is solved further by disposing the plurality of binder holding units such that the binding motion areas are arrayed on a straight line orthogonal to the traveling direction in addition to the configuration of the rebar binding self-propelled robot described in claim 1.

According to an invention of claim 3, the abovementioned problem is solved further by comprising rebar detection units configured to detect a rebar terminal portion of the rebar on which the wheel unit travels are provided in front of the front wheel and behind the rear wheel of the wheel unit in addition to the configuration of the rebar binding self-propelled robot described in claim 1 or 2.

According to an invention of claim 4, the abovementioned problem is solved further by arranging such that the control unit includes a forward/retreat switching control portion configured to switch a forward motion and a retreat motion of the plurality of wheel units in addition to the configuration of the rebar binding self-propelled robot as described in anyone of claims 1 through 3.

Advantageous Effects of Invention

Since the rebar binding self-propelled robot of the present disclosure comprises at least the wheel units each having the rear wheel and the front wheel that travel on any one rebar among the plurality of rebars laid out in the lattice shape, the frame units mounted multiply aligned on the right and left of the wheel units corresponding to array intervals of the rebar on which the wheel units travel, the plurality of binder holding units positioned between the front wheel and the rear wheel of the wheel unit and by which rebar binders that bind mutually intersecting parts of the rebar by using binding wires are detachably mounted, the plurality of driving units each having the binder driving portion that drives the binder holding unit up and down, the plurality of driving units each having a binder driving portion that drives the binder holding unit up and down; and the control unit that controls the travel motion of the wheel units and the binding motions of the rebar binders, it is possible to bind the intersecting parts of the rebars by the binding wires while automatically traveling on the plurality of rebars laid out on the work surface in the lattice shape. It is also possible to increase efficiency in binding the rebars by increasing the number of juxtaposed wheel units as compared with a prior art manual binding work and with a binding work of a rebar binding self-propelled robot provided with one rebar binding mechanism. As a result, it is possible to remarkably shorten a required time of the binding work on the work surface.

It is also possible to readily achieve such maintenance works as replenishment of the binding wires and replacement of worn parts that occur in the rebar binders detachably mounted to the rebar binding self-propelled robot because the rebar binders can be removed even in a case where it becomes necessary to replenish the binding wires charged in the rebar binders and to replace the worn parts or even if the rebar binder causes some failure by detachably mounting the rebar binder per wheel unit. Besides, the rebar binding self-propelled robot of the present disclosure brings about the following peculiar advantageous effects.

According to the inventive rebar binding self-propelled robot of claim 1, because the plurality of driving units is provided with trigger driving pins, respectively, and the control unit includes the binding control portion that causes the trigger driving pins of the plurality of driving units to simultaneously press the triggers of the plurality of rebar binders and because the plurality of rebar binders mounted by the plurality of binder holding units perform the binding motions simultaneously, it is possible to eliminate a stand-by time of another binder holding unit during the binding work as compared to a prior art case where the rebar binder mounted by another binder holding unit starts a binding work after the binding work of the rebar binder mounted by one binder holding unit has been finished. Thus, the binding works can be performed efficiently and stably.

According to the inventive rebar binding self-propelled robot of claim 2, because the plurality of binder holding units is disposed such that the binding motion areas are arrayed on the straight line orthogonal to the traveling direction and because binding positions of the plurality of intersecting parts of one rebar laid out in an orthogonal direction with respect to the rebar in the traveling direction are collectively positioned, the plurality of intersecting parts can be bound accurately and steadily in addition to the advantage effect brought about by the invention of claim 1.

According to the inventive rebar binding self-propelled robot of claim 3, the rebar detection units configured to detect the rebar terminal portion of the rebar on which the wheel unit travels are provided in front of the front wheel and behind the rear wheel of the wheel unit in addition to the advantage effect brought about by the invention of claim 1 or 2, it is possible for the control unit to stop and control the travel motion of the forward motion or the retreat motion because the detection signals detecting the rebar terminal portions of the rebars on which the wheel units travel are transmitted to the control unit.

According to the inventive rebar binding self-propelled robot of claim 4, because the control unit comprises the forward/retreat switching control portion configured to switch the forward motion and the retreat motion of the plurality of wheel units in addition to the advantage effects brought about by the invention of anyone of claims 1 through 3, it is not necessary to turn around the orientation of the rebar binding self-propelled robot itself and binding works that are to be performed by making a turn can be performed simply and efficiently because the traveling direction of the rebar binding self-propelled robot is switched between the forward motion and the retreat motion in performing the binding works by making the turn in the work site.

DESCRIPTION OF EMBODIMENTS

Specific exemplary embodiments of the present disclosure may be configured in any manner as long as a rebar binding self-propelled robot comprises at least wheel units each having a rear wheel and a front wheel that travel on any one rebar among a plurality of rebars laid out in a lattice shape, frame units mounted multiply and aligned on the right and left of the wheel units corresponding to array intervals of the rebar on which the wheel unit travel, a plurality of binder holding units positioned between the front wheel and the rear wheel of the wheel unit and by which rebar binders bind mutually intersecting parts of the rebars by using binding wires are detachably mounted, a plurality of driving units each having a binder driving portion that drives the binder holding unit up and down and a control unit that controls travel motions of the wheel units and binding motions of the rebar binders, wherein the plurality of driving units is provided respectively with trigger driving pins at positions where the trigger driving pins touch and press the triggers of the rebar binders in a condition in which binding motion areas provided as spaces between arms and curl guides of the rebar binders overlap with mutually intersecting parts of the rebars and wherein the control unit includes a binding control portion that causes the trigger driving pins of the plurality of driving units to simultaneously press the triggers of the plurality of rebar binders by simultaneously lowering the plurality of binder holding units. Thus, the rebar binding self-propelled robot efficiently and stably binds the plurality of rebars laid out on the work surface in the lattice shape by the binding wires and achieves maintenance works such as replenishment of the binding wires and replacement of worn parts that occur in the rebar binder.

For instance, the specific number of juxtaposed wheel units in the rebar binding self-propelled robot may be any plural number more than at least two, and two- or three-wheel units are preferable from an aspect of operability.

For instance, the rebar binding self-propelled robot may be any one of a rebar binding self-propelled robot including one wheel unit having front and rear wheels composed of flange type wheels and including one wheel unit having front and rear wheels composed of flat rolls, of a rebar binding self-propelled robot including one wheel unit having front and rear wheels composed of flange type wheels and including two wheel units having front and rear wheels composed of flat rolls and a rebar binding self-propelled robot including two wheel units having front and rear wheels composed of flange type wheels.

The rebar binder mounted per each wheel unit in the rebar binding self-propelled robot of the present disclosure may be any rebar binder as long as it is a commercially sold handheld electric rebar binder such as an existing rebar binder that can be detachably mounted. For instance, the rebar binder may be the rebar binder "TWINTIER" (registered trademark)" RB-440T made by Max Co. Ltd.

If the rebar binder is constructed to be attachable per wheel unit, it is possible to simply achieve maintenance works of the rebar binding self-propelled robot because the rebar binder can be removed per wheel unit even in a case where the binding wires need to be replenished, worn parts need to be replaced or some trouble occurs in the rebar binder.

It is also possible to arrange such that a binding pattern of the rebar binding self-propelled robot of the present disclosure can be selected from two-skip binding besides bind-all and zigzag binding. It is also possible to arrange so as to be able to select such that the rebar binding self-propelled robot performs only the travel motion without performing the binding motion.

It is also possible to arrange such that a trigger driving pin of a binder driving portion touchs a trigger of the rebar binder when the rebar binder is mounted by the binder holding unit and the trigger driving pin is also lowered simultaneously with the rebar binder, and when the rebar binder and the trigger driving pin are lowered to a position where a binding motion area provided as a space between an arm of the rebar binder and a curl guide overlap with the intersecting parts of rebars, only the trigger driving pin is stopped to be lowered so as to press the trigger of the rebar binder that continues to be lowered.

First Embodiment

A rebar binding self-propelled robot 100 according to an exemplary embodiment of the present disclosure will be described below based on to FIGS. 1 through 5.

Figure 1:
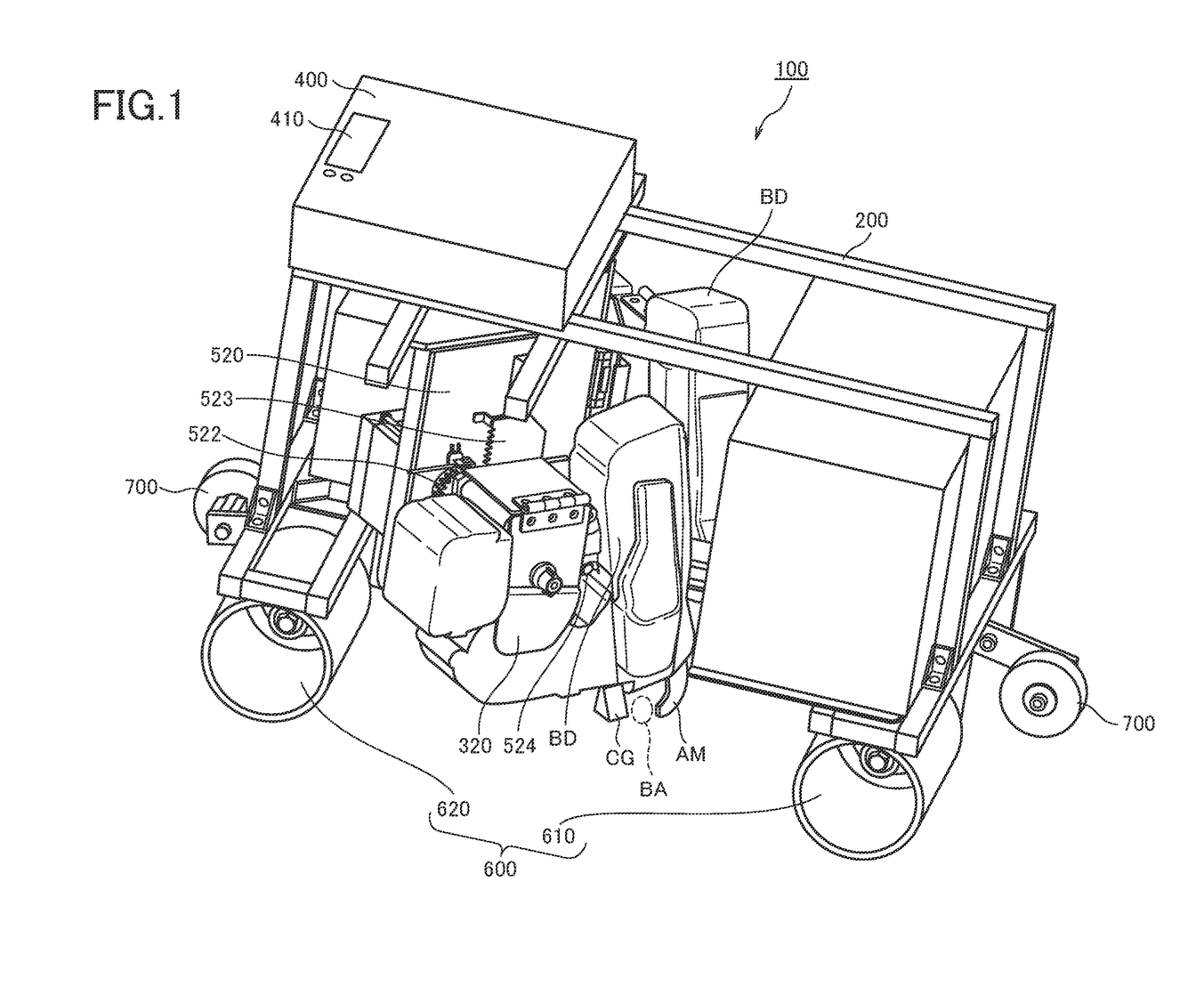
FIG. 1 is a front right perspective view illustrating a rebar binding self-propelled robot according to an exemplary embodiment of the present disclosure.
Figure 2:
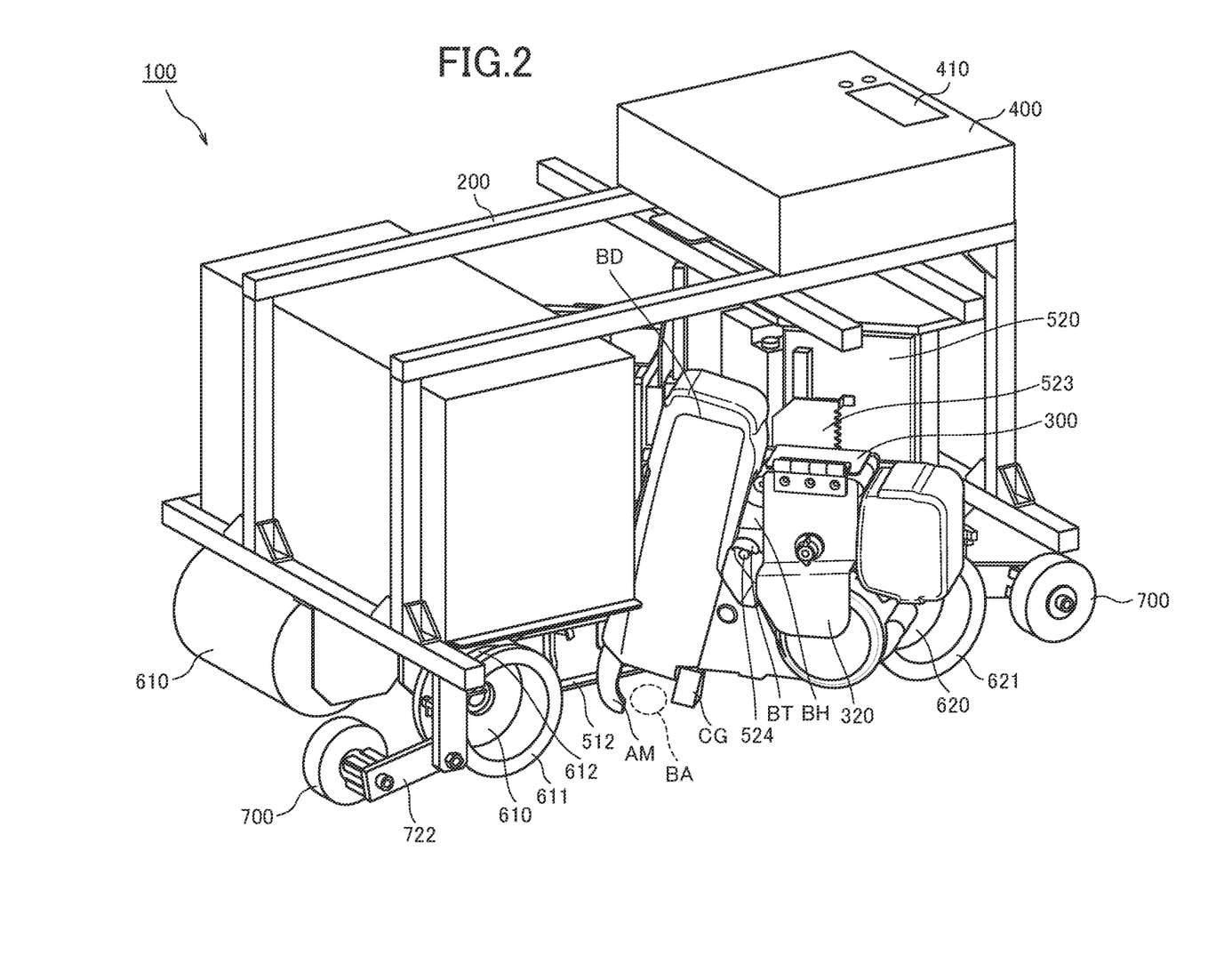
FIG. 2 is a front left perspective view illustrating the rebar binding self-propelled robot according to the exemplary embodiment of the present disclosure.
Figure 3:
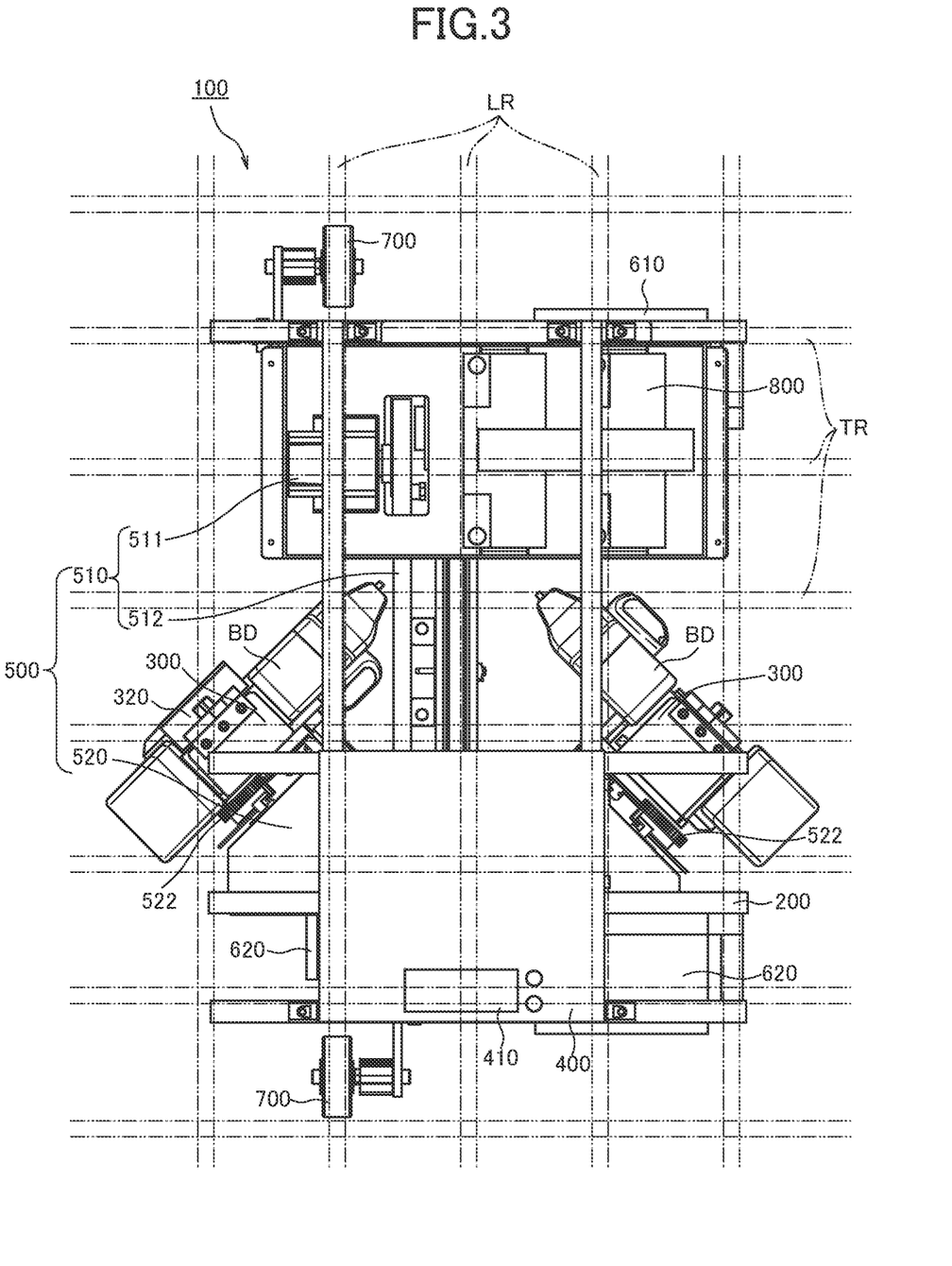
FIG. 3 is a diagram illustrating a self-propelled state of the rebar binding self-propelled robot as illustrated in FIG. 1.
Figure 4:
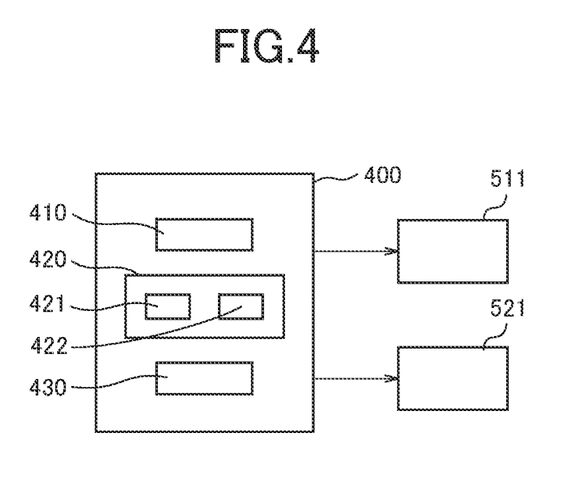
FIG. 4 is a block diagram illustrating a relationship of a conveyance motor and a driving motor controlled by a control unit of the rebar binding self-propelled robot as illustrated in FIG. 1.
Figure 5:
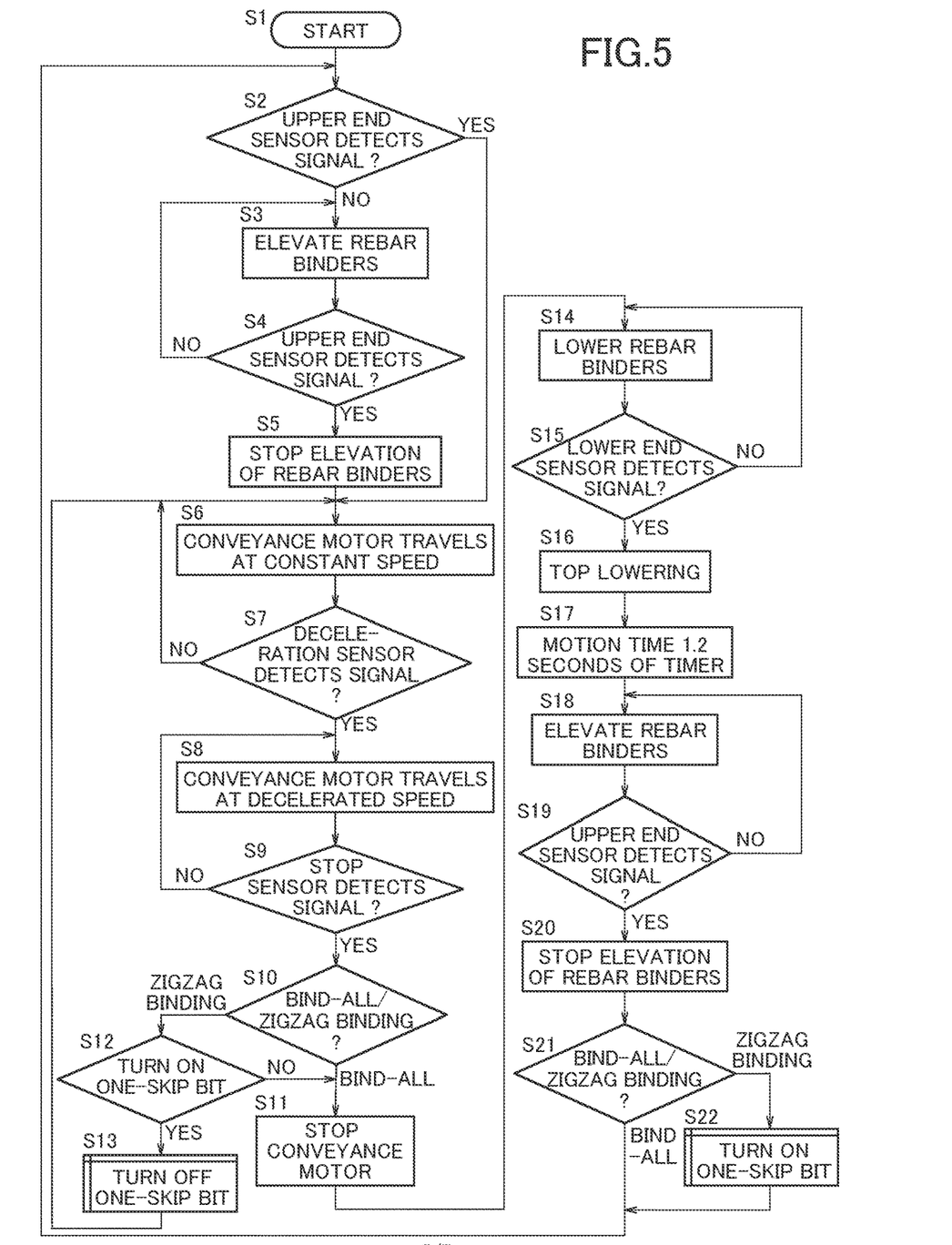
FIG. 5 is a flowchart illustrating a control flow of the rebar binding self-propelled robot as illustrated in FIG. 1.
Figure 6:
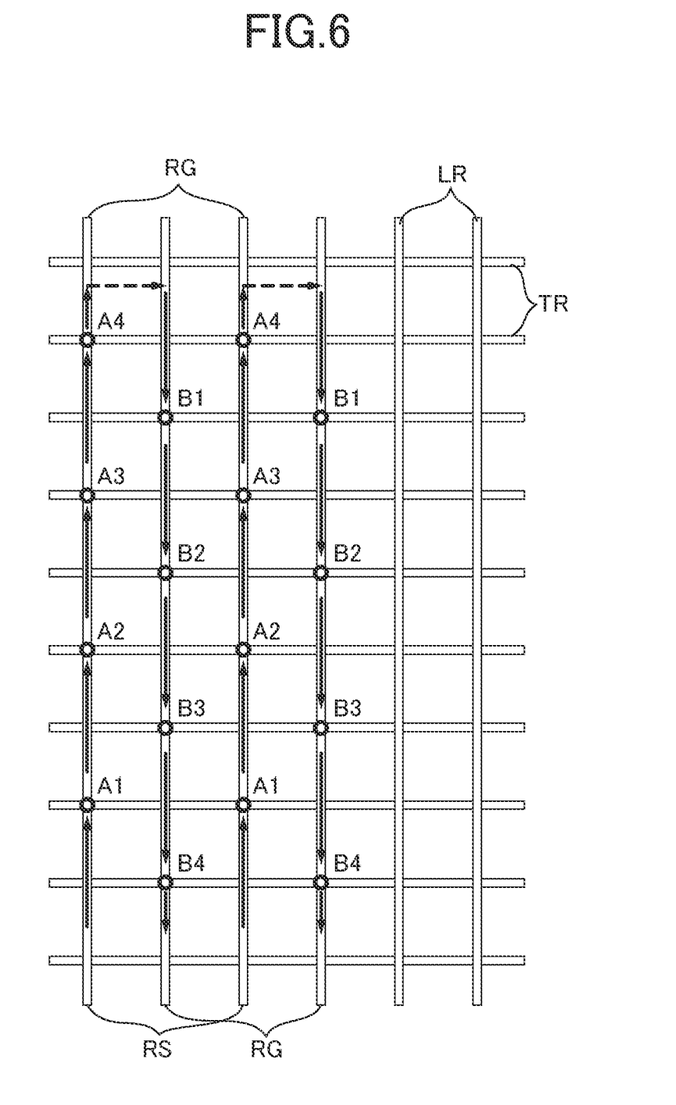
FIG. 6 is a diagram illustrating a binding pattern of zigzag binding of the rebar binding self-propelled robot as illustrated in FIG. 1.
Figure 7:
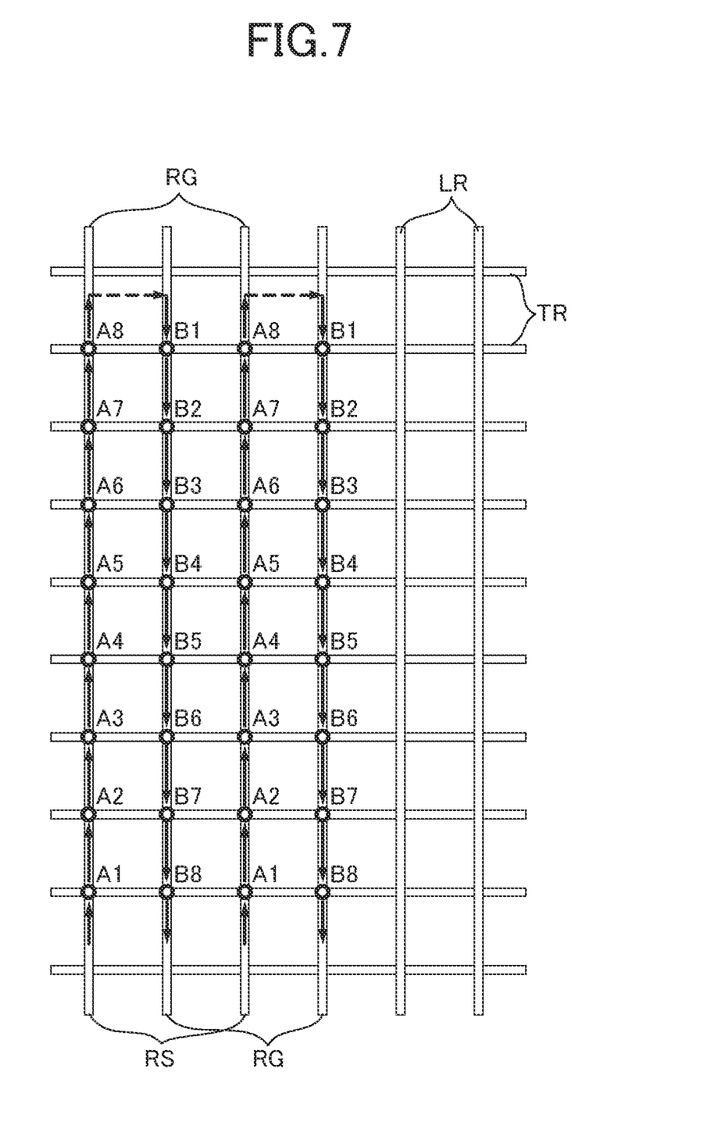
FIG. 7 is a diagram illustrating a binding pattern of bind-all of the rebar binding self-propelled robot as illustrated in FIG. 1.

Here, FIG. 1 is a front right perspective view illustrating the rebar binding self-propelled robot according to an exemplary embodiment of the present disclosure, FIG. 2 is a front left perspective view illustrating the rebar binding self-propelled robot according to the exemplary embodiment of the present disclosure, FIG. 3 is a diagram illustrating a self-propelled state of the rebar binding self-propelled robot as illustrated in FIGS. 1 and 2, FIG. 4 is a block diagram illustrating a relationship of a conveyance motor and a driving motor controlled by a control unit of the rebar binding self-propelled robot as illustrated in FIGS. 1 and 2, FIG. 5 is a flowchart illustrating a control flow of the rebar binding self-propelled robot as illustrated in FIGS. 1 and 2, FIG. 6 is a diagram illustrating a zigzag binding pattern of the rebar binding self-propelled robot as illustrated in FIGS. 1 and 2 and FIG. 7 is a diagram illustrating a whole binding pattern of the rebar binding self-propelled robot as illustrated in FIGS. 1 and 2.

As illustrated in FIGS. 1 through 3, the rebar binding self-propelled robot 100 of the present exemplary embodiment comprises a frame unit 200, a binder holding unit 300, a control unit 400, a driving unit 500, a wheel unit 600, a rebar detection unit 700 and a power unit 800.

The frame unit 200 is composed of frame members that permit and fix other units to be disposed at various places.

Rebar binders BD are mounted respectively by holding portions 310 of the binder holding unit 300 and are covered by cover portions 320.

As the rebar binder BD to be mounted by the binder holding unit 300, a hand-held rebar binder "TWINTIER" (registered trademark) RB-440T made by Max Co. Ltd. is adopted in the present exemplary embodiment.

Still further, when handles BH of the rebar binders BD are mounted by the holding portion 310 of the binder holding unit 300, the binder holding unit 300 are configured such that regions where binding are conducted by the respective rebar binders BD, i.e., binding motion areas BA specified as spaces between an the arm AM and a curl guide CG for conducting the binding motions on an the mutually intersecting parts CP of the rebars, are arrayed laterally side-by-side, i.e., arrayed on a straight line orthogonal to a traveling direction.

The control unit 400 is composed of a CPU, memories and others and can control operations of the rebar binding self-propelled robot 100 by loading various programs and data stored in the memory, e.g., a ROM, to a RAM and by executing the various programs.

The control unit 400 includes an input portion 410, a power switch and a start button and is configured such that an operator can select an advance direction of the rebar binding self-propelled robot 100 such as "forward" and "retreat" for example.

As illustrated in FIG. 4, the control unit 400 includes a wheel drive control portion 420 therein. The wheel drive control portion 420 also includes a travel control portion 421 configured to control travel motions related to acceleration/deceleration and to stoppage of a wheel driving portion 510 of the driving unit 500 described later and a forward/retreat switching control portion 422 configured to control and switch a forward motion with a retreat motion in the wheel driving portion 510 of the driving unit 500 described later. The control unit 400 also includes a binding control portion 430 configured to control an up and down drive of the binder holding unit 300 in a binder driving portion 520 of the driving unit 500 described later.

The driving unit 500 includes the wheel driving portion 510 and the binder driving portion 520.

The wheel driving portion 510 comprises a conveyance motor 511 and a transmission belt 512 and is configured such that a driving force of the conveyance motor 511 is transmitted to the wheel unit 600 through the transmission belt 512.

The binder driving portion 520 includes a driving motor 521, a driving gear 522, a driving rack 523 and a trigger driving pin 524.

The binder driving portion 520 drives the binder holding unit 300 up and down by transmitting a power of the driving motor 521 to the binder holding unit 300 through the driving gear 522 and the driving rack 523.

Then, when the binder holding unit 300 is lowered and the binding motion area BA specified as the space between the arm AM and the curl guide CG is lowered to the mutually intersecting part CP of the rebars, the trigger BT of the rebar binder BD mounted by the binder holding unit 300 comes into contact with the trigger driving pin 524 of the binder driving portion 520. The rebar binder BD is configured to automatically perform the binding works as the trigger BT of the rebar binder BD is touched and pressed by the trigger driving pin 524 of the binder driving portion 520.

The wheel unit 600 includes a front wheel 610 and a rear wheel 620.

Among a lateral pair of wheel units 600, a left front wheel 610 composing the left wheel unit 600 includes a front wheel flange 611 and a rear wheel tread 612 and a left rear wheel 620 includes a rear wheel flange 621 and a rear wheel tread. That is, the wheel units 600 are flange-shaped wheels.

The binder holding unit 300 is positioned between the front wheel 610 and the rear wheel 620 of the respective lateral pair of wheel units 600.

The lateral pair of wheel units 600 is disposed in the frame unit 200 while orienting in the traveling direction and is configured such that their fixed disposed positions can be adjusted laterally corresponding to array intervals of traveling rebars LR to be bound.

The rebar detecting units 700 are provided projectively in front of the front wheel 610 and behind the rear wheel 620 to detect whether there exists a rebar in the advance direction.

The power unit 800 is a power source mounted within the frame unit 200 to feed power to each unit.

Next, a flow of operations in binding the rebars laid in the lattice shape on the work surface to which concrete is placed by using the rebar binding self-propelled robot 100 of the present disclosure and an operation flow of the rebar binding self-propelled robot 100 will be described as a reinforcement work of laying reinforcement grating of a concrete structure with reference to FIGS. 5 and 6.

As a concrete work, spacers not illustrated are disposed first at predetermined intervals on the work surface to which concrete is placed in a construction site, and orthogonal rebars TR are arrayed at intervals of 300 mm for example on the spacers to assure a cover to the work surface. Still further, traveling rebars LR are disposed in a direction orthogonal to the orthogonal rebars TR at equal intervals to lay the traveling rebar LR and in the lattice shape as a whole.

Next, the rebar binding self-propelled robot 100 is lift up to place the front wheel 610 and the rear wheel 620 composing the left wheel unit 600 in a vicinity of a rebar starting end portion RS on the traveling rebar LR located at the leftmost side among the traveling rebars LR already laid.

Because the left side front wheel 610 and the rear wheel 620 are composed of the flange type wheels, the traveling rebar LR regulates right and left positions of the wheel unit 600 with respect to the traveling direction or right and left positions of the rebar binding self-propelled robot 100 by placing the wheels on the traveling rebar LR.

Meanwhile, a width between the wheel units 600 is adjusted such that the front wheel 610 and the rear wheel 620 composing the right wheel unit 600 are placed in a vicinity of the rebar starting end portion RS on a third traveling rebar LR from the left.

To that end, the left wheel unit 600 and the right wheel unit 600 are placed respectively on the traveling rebars LR laid by being separated from each other across one traveling rebar LR.

In other words, the wheel units 600 are disposed such that one rebar extending along the traveling direction is disposed between the pair of wheel units.

The front wheel 610 and the rear wheel 620 composing the right wheel unit 600 of the present exemplary embodiment are formed respectively into a shape of drum having no flange.

Next, the power source of the control unit 400 is turned On and the input portion 410 is operated to select the advance direction of the "forward motion" among the "forward motion" and "retreat motion" and to select the binding mode among "bind-all" or "zigzag binding".

A case where the "zigzag binding" is selected as the binding mode will be described in the present exemplary embodiment.

Note that the zigzag binding refers to a pattern of binding the intersecting parts alternately on one rebar and alternately with neighboring rebars as illustrated in FIG. 6.

Next, when a start button is pressed in Step S1 (described by denoted as 'S1' for example), it is determined whether the right and left binder holding units 300, 300 are positioned respectively at uppermost parts by a detection signal from an upper end sensor not illustrated in Step S2. In a case where the signal is detected, the process advances to Step S6 described later and in a case where no signal is detected, the right and left binder holding units 300, 300 start to elevate in Step S3.

After that, it is determined whether the right and left binder holding units 300, 300 are positioned respectively at the uppermost parts by the detection signal from the upper end sensor in Step S4. In a case where no signal is detected, the process returns to Step S3 to continue to elevate the binder holding units 300, 300 and in a case where the signal is detected, the elevation of the right and left binder holding units 300, 300 is stopped in Step S5.

Next, the power of the conveyance motor 511 is transmitted to the left front wheel 610 and rear wheel 620 such that the whole rebar binding self-propelled robot 100 starts to travel forward at a constant speed in Step S6.

While the rebar binding self-propelled robot 100 travels forward at the constant speed, it is determined whether a deceleration sensor not illustrated detects the orthogonal rebar TR in Step S7. When the deceleration sensor detects no orthogonal rebar TR, the process returns to Step S6 to continue to advance in the constant speed. When the deceleration sensor detects the orthogonal rebar TR, the conveyance motor 511 decelerates and the rebar binding self-propelled robot 100 travels in a decelerated speed in Step S8.

After that, it is determined whether a stop sensor not illustrated detects the orthogonal rebar TR in Step S9. When the sensor detects no orthogonal rebar TR, the process returns to Step S8 to continue to travel forward in the constant speed. In a case when the stop sensor detects the orthogonal rebar TR, it is determined whether the original setting has been the bind-all or zigzag binding in Step S10. Because the zigzag binding has been selected in the present exemplary embodiment, the process shifts to Step S12 to determine whether a one-skip bit is ON or OFF. In a case where the one-skip bit is OFF, the conveyance motor 511 stops in Step S11. In a case where the one-skip bit is ON, the one-skip bit is turned OFF in Step S13 and the process returns to Step S6.

After Step S11, the rebar binders BD, BD mounted by the binder holding units 300, 300 are lowered in Step S14.

It is determined whether the right and left binder holding units 300, 300 are positioned respectively at lowermost parts by detecting a detection signal from a lower end sensor not illustrated in Step S15. In a case where no signal is detected, the process returns to Step S14 to continue to lower the binder holding units 300, 300. In a case where the signal is detected, the binder holding units 300, 300 are stopped to be lowered in Step S16.

The binder driving portions 520, 520 of the driving unit 500 comprise trigger driving pins 524, 524. When the pair of right and left rebar binders BD, BD mounted respectively by the right and left binder holding units 300, 300 are lowered as the pair of right and left binder holding units 300, 300 are lowered and arrive at a binding position suitable for binding the traveling rebar LR with the orthogonal rebar TR, i.e., when the binding motion area BA, BA overlap with the intersecting parts CP, CP of the rebars, the trigger driving pins 524, 524 of the binder driving portions 520, 520 touch and press the triggers BT, BT of the rebar binders BD, BD and thus the rebar binders BD, BD automatically perform the binding motion.

In other words, the trigger driving pins 524, 524 of the binder driving portions 520, 520 are disposed at the positions where they touch and press the triggers BT, BT of the rebar binders BD, BD in a condition in which the binding motion area BA, BA provided as the space between the arm AM of the rebar binders BD, BD and the curl guide CG overlaps respectively with the intersecting parts CP, CP of the rebars.

The present exemplary embodiment is configured such that the trigger driving pins 524, 524 simultaneously touch and press the triggers BT, BT of the pair of right and left rebar binders BD, BD when the pair of right and left binder driving portions 520, 520 move the pair of right and left binder holding units 300, 300 downward and the rebar binders BD, BD mounted on right and left perform the binding works simultaneously at two right and left intersecting parts CP, CP on the same orthogonal rebar TR intersecting with the traveling rebar LR.

That is, while the pair of right and left binder driving portions 520, 520 simultaneously drive and lower the pair of right and left binder holding units 300, 300, it is possible to cause the pair of right and left rebar binders BD, BD to perform the binding motion automatically and simultaneously because these trigger driving pins 524, 524 simultaneously touch and press the triggers BT, BT as the triggers BT, BT of the pair of right and left rebar binders BD, BD are simultaneously lowered at this time.

The rebar binder BD feeds the binding wire BL bent in the arc shape along the shape of the arm by being pressed by the trigger BT out of the arm AM and winds the bent binding wire BL around the intersecting part CP of the rebars by a predetermined number of times while being received by the curl guide CG. Then, the rebar binder BD twists the binding wire BL to bind the rebars and to cut the binding wire BL. Thus, the mutually intersecting part CP of the rebars is bound.

A time is measured by a timer such that the binder holding units 300, 300 stop for 1.2 seconds for example while being positioned at the lowermost parts in order to cause the rebar binder BD to firmly perform the rebar binding motion in Step S17.

After an elapse of a predetermined time, the binder holding units 300, 300 start to elevate in Step S18.

After that, it is determined whether the right and left binder holding units 300, 300 are positioned respectively at the uppermost parts by detecting a signal from the upper end sensor in Step S19. In a case where no signal is detected, the process returns to Step S18 to continue to elevate the binder holding units 300, 300 and in a case where the signal is detected, the elevation of the binder holding units 300, 300 is stopped in Step S20.

Then, it is determined whether the original setting is the bind-all or the zigzag binding in Step S21. Because the zigzag binding has been selected in the present exemplary embodiment, the one-skip bit is turned ON in Step S22 and the process is shifted to Step S2.

Then, as illustrated in FIG. 6, the intersecting parts of the two traveling rebars LR and the orthogonal rebars TR are bound respectively and alternately in order of A1→A2→A3→A4 along the leftmost traveling rebar TR and the third traveling rebar LR from the left by the operation flow described above.

As described above, the rebar binding self-propelled robot 100 advances while alternately performing the forward motions and the binding motions on the rebars and when the rebar binding self-propelled robot 100 arrives in vicinities of rebar terminal portions RG at rear sides of the traveling rebars LR, the rebar detecting unit 700 provided in front of the rebar binding self-propelled robot 100 detects the rebar terminal portions RG. Then, the rebar detecting unit 700 transmits a detection signal to the control unit 400, a stop signal is transmitted from the wheel drive control portion 420 of the control unit 400 to the wheel driving portion 510 as an interrupt processing, and the rebar binding self-propelled robot 100 stops all of the forward motion and the binding motion on the rebars. Then, the rebar binding self-propelled robot 100 is put into an input standby state of waiting for an input through the input portion 410.

The operator of the concrete works lifts up the rebar binding self-propelled robot 100 in this stage to place on the neighboring traveling rebars LR, i.e., on the second and fourth traveling rebars LR from the left, as illustrated by dotted line arrows in FIG. 6.

Because the advance direction of the rebar binding self-propelled robot 100 can be controlled at this time such that the "forward motion" is performed in an outward path and the "retreat motion" is performed in a return path by the forward/retreat switching control portion 422 within the control unit 400, it is unnecessary to rotate to change the direction of the rebar binding self-propelled robot 100 itself in replacing the rebar binding self-propelled robot 100 on the neighboring traveling rebars LR.

After placing the rebar binding self-propelled robot 100 on the neighboring traveling rebars LR, the operator manipulates the input portion 410 to select the advance direction of the return path to the "retreat motion" and the binding mode to the "zigzag binding" similarly to that in the outward path.

The rebar binding self-propelled robot 100 performs the alternate binding works on the intersecting parts CP, which have been performed on the leftmost traveling rebar TR and the third traveling rebar LR from the left, in the same manner also on the second and fourth traveling rebars LR while retreating on the return path. Thereby, the intersecting parts of the two traveling rebars LR and the orthogonal rebars TR are respectively and alternately bound in order of B1→B2→B3→B4.

As the rebar binding self-propelled robot 100 retreats while alternately performing the retreat motions and the binding motions on the rebars and when the rebar binding self-propelled robot 100 arrives in vicinities of rebar terminal portions RG at front sides of the traveling rebars LR, the rebar detecting unit 700 provided behind the rebar binding self-propelled robot 100 detects the front side rebar terminal portions RG. Then, the rebar detecting unit 700 transmits a detection signal to the control unit 400, a stop signal is transmitted from the wheel drive control portion 420 of the control unit 400 to the wheel driving portion 510 and the rebar binding self-propelled robot 100 stops all of the retreat motion and the binding motion on the rebars. Then, the rebar binding self-propelled robot 100 is put into an input standby state of waiting for an input through the input portion 410.

As described above, according to the present exemplary embodiment, the rebar binding self-propelled robot 100 completes the zigzag binding of the traveling rebars LR of four in total while traveling on the traveling rebars LR and making one reciprocation, i.e., while performing so-called Boustrophedon binding sequence.

Then, it is possible to complete the zigzag binding of the traveling rebars LR and the orthogonal rebars TR laid in the lattice shape on the work surface to which concrete is placed efficiently across the whole surface by making the traveling rebars LR into groups of four.

Second Embodiment

A case where the "bind-all" is selected as the binding mode after turning On the control unit 400 and operating the input portion 410 will be described as another exemplary embodiment.

In a case where the bind-all is selected, it is possible to bind the rebars laid in the lattice shape on the work surface to which concrete is placed by using the rebar binding self-propelled robot 100 of the present exemplary embodiment similarly to the first exemplary embodiment other than that the process is shifted in Step S10 to Step S11 in FIG. 5, that the conveyance motor is stopped in Step S11 and that the process is shifted from step S21 to Step S2.

Note that in the binding pattern of this case, all intersecting parts of the two traveling rebars LR and the orthogonal rebars TR are bound in order of A1→A2→A3→A4→A5→A6→A7→A8 along the leftmost traveling rebar LR and the third traveling rebar LR from the left in the outward path as illustrated in FIG. 7. In the return path, all of the intersecting parts of the two traveling rebars LR and the orthogonal rebars TR are respectively bound in order of B1→B2→B3→B4→B5→B6→B7→B8 by performing in the same manner also on the second and fourth traveling rebars LR from the left while retreating in the return path.

As described above, according to the rebar binding self-propelled robot 100 of the present exemplary embodiment, it is possible to increase efficiency in binding the rebars by increasing the number of juxtaposed wheel units and to remarkably shorten a required time of the binding work on the work surface, as compared with a prior art manual binding work and with a binding work of rebar binding self-propelled robot provided with one rebar binding mechanism, by binding the intersecting parts CP, CP of the rebars by the binding wires BL while self-traveling the plurality of rebars laid in the lattice shape on the work surface by the rebar binding self-propelled robot at least comprising the wheel units 600 each having the rear wheel 620 and the front wheel 610 that travel on any one rebar laid among the plurality of rebars laid out in the lattice shape, the frame units 200 in which the pair of wheel units 600 are juxtaposed mounted corresponding to the array intervals of the rebar on which the wheel units 600 travel, the plurality of right and left binder holding units 300, 300 positioned between the front wheel and the rear wheel of the wheel unit 600 and by which the rebar binders BD bind the intersecting parts of the rebars by using the binding wires BL are detachably mounted respectively per each wheel unit 600, the pair of right and left driving units 500, 500 respectively including the binder driving portions 520, 520 configured to vertically drive these binder holding units 300, 300 and the control unit 400 that controls the travel motion of the wheel units 600, 600 and the binding motion of the rebar binders BD, BD.

It is also possible to readily achieve such maintenance works as replenishment of the binding wires BL and replacement of worn parts that occur in the rebar binders BD of the rebar binding self-propelled robot 100 by detachably attaching the rebar binders BD to the binder holding units 300 per each wheel unit 600.

Still further, it is also possible to cause the rebar binders BD to automatically perform the binding motion just by lowering the binder holding units 300 as the pair of right and left driving units 500, 500 is proved respectively with the trigger driving pins 524 of the binder driving portion 520 at the positions where the trigger driving pins 524 touch and press the triggers BT of the rebar binders BD in the state in which the binding motion areas BA, BA provided as the spaces between the arms AM of the rebar binders BD and the curl guides CG overlap with the mutually intersecting parts CP, CP of the rebars.

Still further, because the control unit 400 includes the binding control portion 430 that simultaneously lowers the pair of right and left binder holding units 300, 300 and that causes the trigger driving pins 524, 524 of the pair of right and left driving units 500, 500 to simultaneously press the triggers BT, BT of the pair of right and left rebar binders BD, BD, it is possible to eliminate a stand-by time of another binder holding unit 300 during a binding work, as compared to a prior art case of starting a binding work by the other rebar binder mounted by the other binder holding unit 300 after finishing the binding work by the rebar binder mounted by one binder holding unit 300. Thus, the advantageous effects of the present exemplary embodiment are remarkable as the binding operation can be performed by the binding wires efficiently and stably in the right and left directions.

INDUSTRIAL APPLICABILITY

The rebar binding self-propelled robot of the present invention automatically travels on a plurality of rebars laid on a work surface in a lattice shape and is equipped with rebar binders that bind mutually intersecting parts of the rebars.

REFERENCE SIGN LIST

100 . . . rebar binding self-propelled robot
200 . . . frame unit
300 . . . binder holding unit
310 . . . holding portion
320 . . . cover portion
400 . . . control unit
410 . . . input portion
420 . . . wheel drive control portion
421 . . . travel control portion
422 . . . forward/retreat switching control portion
430 . . . binding control portion
500 . . . driving unit
510 . . . wheel driving portion
511 . . . conveyance motor
512 . . . transmission belt
520 . . . binder driving portion
521 . . . driving motor
522 . . . driving gear
523 . . . driving rack
524 . . . trigger driving pin
600 . . . wheel unit 610 . . . front wheel
611 . . . front wheel flange
612 . . . rear wheel tread
620 . . . rear wheel
621 . . . rear wheel flange
700 . . . rebar detecting unit
800 . . . power unit
BD . . . rebar binder
BA . . . binding motion area
BT . . . trigger
BH . . . handle
AM . . . arm
CG . . . curl guide
LR . . . traveling rebar
TR . . . orthogonal rebar
RS . . . rebar starting end portion
RG rebar terminal portion
CP . . . intersecting part of rebars

The invention claimed is:

1. A self-propelled robot for rebar binding at least comprising:
 wheels including a rear wheel and a front wheel that travel on any one rebar among a plurality of rebars laid out in a lattice shape;
 frames mounted multiply aligned on the right and left of the wheels corresponding to array intervals of the rebar on which the wheels travel;
 a plurality of binder holding mounts positioned between the front wheel and the rear wheel of the wheels, and configured to detachably mount rebar binders that bind mutually intersecting parts of the rebars by using binding wires;
 a plurality of drivers each having a binder driving portion that drives the binder holding mounts up and down;
 a processor that controls travel motions of the wheels and binding motions of the rebar binders,
 wherein the plurality of drivers is provided with trigger driving pins, respectively, and
 wherein the processor causes the trigger driving pins of the plurality of drivers to simultaneously press triggers of the plurality of rebar binders.

2. The self-propelled robot for rebar binding according to claim 1, wherein the plurality of binder holding mounts is disposed such that binding motion areas are arrayed on a straight line orthogonal to the traveling direction.

3. The self-propelled robot for rebar binding according to claim 1, further comprising rebar detectors configured to detect a rebar terminal portion of the rebar on which the wheels travel provided in front of the front wheel and behind the rear wheel.

4. The self-propelled robot for rebar binding according to claim 1, wherein the processor is further configured to switch a forward motion and a retreat motion of the wheels.

5. The self-propelled robot for rebar binding according to claim 2, further comprising rebar detectors configured to detect a rebar terminal portion of the rebar on which the wheels travel provided in front of the front wheel and behind the rear wheel.

6. The self-propelled robot for rebar binding according to claim 2, wherein the processor is further configured to switch a forward motion and a retreat motion of the wheels.

7. The self-propelled robot for rebar binding according to claim 3, wherein the processor is further configured to switch a forward motion and a retreat motion of the wheels.

* * * * *

UNITED STATES PATENT AND TRADEMARK OFFICE
CERTIFICATE OF CORRECTION

| | |
|---|---|
| PATENT NO. | : 11,035,136 B1 |
| APPLICATION NO. | : 17/054019 |
| DATED | : June 15, 2021 |
| INVENTOR(S) | : Tatsuya Manabe et al. |

It is certified that error appears in the above-identified patent and that said Letters Patent is hereby corrected as shown below:

On the Title Page

Item [73], should read -- Ken Robotech Corp., Kagawa, (JP), and SUN-S CO., LTD., Hiroshima (JP) --

Signed and Sealed this
Twenty-second Day of November, 2022

Katherine Kelly Vidal
*Director of the United States Patent and Trademark Office*